United States Patent [19]

Hozumi et al.

[11] Patent Number: 4,818,623

[45] Date of Patent: Apr. 4, 1989

[54] SLIDE GLASS

[75] Inventors: Toyoharu Hozumi; Yoshihiro Ohshita, both of Hiroshima, Japan

[73] Assignee: Wakunaga Seiyaku Kabushiki Kaisha, Osaka, Japan

[21] Appl. No.: 935,724

[22] Filed: Nov. 28, 1986

[30] Foreign Application Priority Data

Nov. 28, 1985 [JP] Japan ................... 60-268176

[51] Int. Cl.$^4$ ............... B32B 17/06; G01N 33/48; G02B 21/34
[52] U.S. Cl. ................... 428/447; 428/13; 428/410; 428/429; 350/534; 424/3
[58] Field of Search ............ 428/409, 410, 429, 447, 428/13; 350/534, 535, 536; 356/244; 436/174; 424/3

[56] References Cited

U.S. PATENT DOCUMENTS

| | | | |
|---|---|---|---|
| 3,770,477 | 11/1973 | Welchselbaum | 350/534 |
| 4,263,350 | 4/1981 | Valimont | 428/429 X |
| 4,647,543 | 3/1987 | Stöcker | 424/3 X |
| 4,705,705 | 11/1987 | Bross | 350/534 X |
| 4,711,820 | 12/1987 | Arkles et al. | 428/429 |

FOREIGN PATENT DOCUMENTS 0159603 10/1985 European Pat. Off. ............... 424/3

OTHER PUBLICATIONS

Dow Corning "Chlorosilanes and Silazanes . . . Five Ways to Improve Your Product and Process" C&EN, Aug. 9, 1971.

Primary Examiner—Ellis P. Robinson
Assistant Examiner—Susan S. Rucker
Attorney, Agent, or Firm—Oblon, Fisher, Spivak, McClelland & Maier

[57] ABSTRACT

A slide glass comprising a slide glass structure having a glass surface with silicic acid groups and a lipophilic functional group introduced into at least a part of said silicic acid groups. By the lipophilic group thus introduced, peel-off of the cell specimen does not readily occur.

7 Claims, No Drawings

SLIDE GLASS

BACKGROUND OF THE INVENTION

1. Technical Field

This invention relates to a worked slide glass. More particularly, the present invention relates to a slide glass for the fixing of a cell tissue specimen, that is, a slide glass worked so as to fix a cell, etc., during observation of a cut tissue strip, etc., of a cell by microscope.

2. Prior Art

To date, the microscope has been variously improved since it was invented by Z. Jansen in 1590. At present, it is being widely used also for clinical tests such as diagnosis of disease conditions according to the pathological method in the field of medicine. This clinical test method comprises forming various cells into tissue strips, preparing specimens from these by following the known conventional method [as described in the textbook "Manual of Pathological Technique 3—Technique of Preparing Tissue Specimens—" (Volume I, 1981) published by Ishiyaku Shuppan], fixing the specimen on a slide glass and further staining the specimen. Subsequently, by observing the stained state of the cell (distribution of stained bodies, the degree of staining, etc.) by a microscope, the detection of the presence or absence of disease or analysis of the condition of a disease is ordinarily practiced.

There are various staining methods practiced in the above method (textbook "All about Staining Methods" (1984) published by Ishiyaku Shuppan, textbook "Manual of Histologic Staining Methods of the Armed Forces Institute of Pathology", published by McGraw Hill Co., etc.), which are used suitably by selection depending on the purpose, the kind of the cell, etc. It is a common practice in the staining methods utilized here in clinical tests to store the cell prepared according to the above known method in a solution composed mainly of water for a long time.

These staining methods are practiced commonly on a slide glass, but there has been an inconvenience in that observation of the presence of disease or analysis of the condition of disease could not be done correctly because a long time was required for the staining operation, whereby the cell peeled off from the slide glass. As for the staining methods which can entail peeling of the cell specimen off from the slide glass with relative ease in performing the above analysis of the condition of disease, etc., the plated silver staining which stains bound tissue, the silver staining which stains peripheral neuron fibers, the Grimelius+ method which is the discriminating staining method of internal secretion cells, the Hellman-Hellerström's method, the aldehyde thionin staining method of Paget et al., the lead hematoxylin staining method of Solcia, the triple staining method of cells types in islet of Langerhans of pancreas, the Fontana-Masson's method and the immunological hystochemical staining method which has recently been particularly utilized may be named. According to these staining methods, the cell specimen is liable to peel off during the staining operation on a slide glass, as is well known in the art.

Accordingly, to solve this problem, a slide glass has been used after treatment with a 0.5% gelatin solution, or an egg white albumin solution (a solution of egg white of one egg dissolved in 500 ml water, to which a small amount of ammonia water is then added) which step is then followed by drying at 60° C. overnight (prior art slide glass). However, the slide glass thus prepared involves the problem of storability, because mold is liable to develop when it is stored over a long time, and therefore it cannot be constantly provided.

SUMMARY OF THE INVENTION

An object of the present invention is to solve the above problems, and it is intended to accomplish this object by increasing the lipophilic property of the glass surface by chemical treatment of a slide glass which has been used in the prior art.

The slide glass according to the present invention comprises a slide glass structure having a glass surface with silicic acid groups and a lipophilic functional group introduced into at least a part of said silicic acid groups.

According to another aspect of the present invention, there is provided a process for producing a stained tissue specimen applied on a slide glass which comprises applying a tissue specimen on a slide glass as referred to above and subjecting the specimen to a staining process.

According to still another aspect of the present invention, there is provided a stained tissue specimen applied on a slide glass produced by the process as above referred to.

The slide glass of the present invention is prepared by the chemical treatment as described above and has the following advantages.

The first avantage is that, when a tissue strip of a cell (hereinafter called "tissue specimen") is stained on the slide glass, no substantial peel-off of the cell specimen occurs. Accordingly, correct judgement on the cell specimen is possible in the above mentioned pathological diagnosis, etc. Next, since the slide glass of the present invention is prepared by the chemical treatment (as described below), there is no possibility of generation of mold, and it is superior in constancy of quality, stability and storability as compared with the slide glass prepared according to the known method as described above (prior art slide glass). Such a slide glass can be provided at a low cost.

It must be admitted that the slide glass of the present invention may be susceptible to peel-off of the cell specimen in the first paraffin removing operation (commonly xylol treatment) when staining a strip embedded in a paraffin layer. With this exception included, the slide glass of the present invention is generally useful particularly as, for example, glass for fixation of a frozen cell specimen.

BRIEF DESCRIPTION OF THE DRAWINGS

In the drawing:

FIG. 1 is a diagrammatic cross section of a slide glass in accordance with an embodiment of the present invention.

FIG. 2 is a diagramatic cross section of a slide glass in accordance with another embodiment of the present invention.

DETAILED DESCRIPTION OF THE INVENTION

Slide glass

In the present invention, "slide glass" means a glass in the shape of a plate which is used for fixing a cell specimen when observed under a microscope. The slide glass according to the present invention has a lipophilic functional group introduced into at least a part of the silicic acid groups (SiOH) which are a constituent of a glass.

In the present invention, "lipophilic functional group" is generally an organic compound functional group of a hydrocarbon or composed mainly of a hydrocarbon such as an alkyl group, an aryl group such as phenyl group, lower alkyl phenyl group, etc., or steroid residue. Preferred groups are alkyl groups and aryl groups, particularly alkyl groups of, e.g. $C_1$-$C_{12}$, above all a lower alkyl group of, e.g., $C_1$-$C_6$.

The lipophilic functional group may be formed by direct bonding of the group as described above to the substrate glass, or alternatively it may be bonded to the substrate glass through a "linker". Which bonding should be selected depends on the agent for introducing the lipophilic functional group (as described in detail below) which is selected in view of the reactivity with the silicic acid group of the glass surface.

The amount of the lipophilic functional group imparted onto the glass surface is selected appropriately depending on the mode in which this group is introduced and the desired "lipophilic degree".

The slide glass in accordance with the present invention is illustrated in FIG. 1 and FIG. 2. FIG. 1 shows a diagrammatic cross-sectional view of the slide glass, wherein the part 1 is a body of a slide glass and the part 2 is a lipophilic layer. FIG. 2 similarly is a cross-sectional view of a slide glass comprising body 1 and a lipophilic layer 2 on each surface of the slide glass body. The lipophilic layer is shown as a coherent mass in these drawings, but should be in the form of a mass of lipophilic "points".

Preparation of slide glass

The slide glass of the present invention can be prepared according to any method which can introduce a lipophilic functional group into the silicic acid group of the glass surface. Introduction of a lipophilic functional group ordinarily comprises causing a compound having a lipophilic group and also having a reactive group capable of bonding the lipophilic functional group onto the glass surface through the reaction with the silicic acid group of the glass surface ("lipophilizing" agent) to react with the silicic acid group.

An example of such a lipophilizing agent is a hydrocarbyl halosilane. Here, the hydrocarbyl group is an alkyl or an aryl group, particularly the former, and the halogen is typically chlorine. The hydrocarbyl halosilane can contain 1 to 3 hydrocarbyl groups but in view of the reactivity with the silicic acid group of glass, a dihydrocarbyl dihalosilane is preferred. On the other hand, although the alkyl group can be one having any desired carbon atoms in the alkyl (see the above description), it is sufficiently a methyl group. Accordingly, one of the most preferable compounds as mentioned above is dimethyldichlorosilane. The reaction with the silicic acid group of the glass surface in that case may be considered to be accompanied by elimination of hydrochloric acid, and the methyl group may be considered to be bonded to the glass surface with the silicon atom derived from the silane as the "linker". The lipophilization of a conventional slide glass with a hydrocarbyl halosilane or, more particularly, siliconization of a conventional slide glass can be applied onto either one of or both the surfaces of the conventional slide glass.

The reaction between the lipophilizing agent and the glass plate as described above may be carried out according to any desired method suited for the purpose. According to a typical example, first, a slide glass is immersed in a solution of dimethyldichlorosilane in carbon tetrachloride for several seconds. The concentration of dimethyldichlorosilane in this case will differ depending on the number or size of the slide glass and the treatment time, but it is preferably about 5% when treating a large amount of slide glasses (for example, products sold on the market) within a relatively short time. As the solvent for dissolving dimethyldichlorosilane, it is possible to use any solvent which does not react with dimethyldichlorosilane and which can be easily removed after use. Subsequently, after removal of the solution, the slide glass is washed with tap water and further washed with distilled water, thereafter being dried to obtain a worked slide glass.

When the slide glass is worked with the use of a solution which is gasifiable under reduced pressure such as the carbon tetrachloride solution of dimethyldichlorosilane, it may be conceivable to employ, for example, a method in which: a slide glass is arranged in a desiccator; the above solution is arranged at the position where a drying agent for the desiccator is to be placed; and then the desiccator is brought internally to a lightly reduced pressure state by utilizing an aspirator, etc., thereby evaporating the solution to introduce the lipophilic functional group into the silicic acid group. The vapor-phase siliconization is disclosed in T. Maniatis et al: Molecular Cloning, page 437, published by Cold Spring Harbor Laboratory (1982).

Use of slide glass of the present invention

The siliconized slide glass is advantageously used for preparing stained tissue samples applied on it wherein a tissue sample applied on the slide glass is subjected to a staining process, since the staining process has sometimes been accompanied by peeling of air applied tissue specimen off a slide glass.

The staining processes which easily result with peeling-off of a tissue specimen from a slide glass include those methods which are mentioned hereinbefore. These methods may be characterized by the fact that the specimens are subjected to treatment with an aqueous staining solution.

EXPERIMENTAL EXAMPLES

Preparation of slide glass

A dried slide glass was immersed in a 5% dimethyldichlorosilane (manufactured by Wako Junyaku, Japan) solution in carbon tetrachloride, then washed with tap water and further washed with distilled water. This was dried to prepare a slide glass of the present invention.

Use of slide glass of the present invention

By the use of the slide glass of the present invention, staining of a cell specimen was conducted on the glass. As control tests, similar experiments were also conducted for a commercially available slide glass and a slide glass applied with the treatment with an egg white albumin solution. Five sheets of each slide glass were employed, and the cell specimen used for staining on the slide glass was prepared from a frozen tissue strip of rat pancrea by means of a microtome.

(1) Fixation of cell specimen

99%, 95%, 80% and 70% alcoholic solutions were prepared and the cell specimen was immersed for 5 minutes in each solution. Subsequently, the specimen was washed with running water for 5 minutes and then left to stand in a Bouin solution at 37° C. for 3 hours to accomplish fixation of the cell specimen.

Here, the Bouin solution comprises the following composition.

| | |
|---|---|
| Aqueous saturated picric acid | 15 ml |
| Formalin | 5 ml |
| Glacial acetic acid | 1 ml |

After the above treatment, the cell specimen was washed with tap water for 30 minutes and further washed three times with distilled water.

(2) Staining

The above cell specimen was placed on the slide glass, pretreated with a 95% alcoholic solution for 2 minutes, and then treated with a silver staining solution at 37° C. for about 16 hours.

Here, the silver staining solution comprises the following composition.

| | |
|---|---|
| Silver nitrate | 10 g |
| Distilled water | 10 ml |
| 95% Alcohol | 90 ml |
| 1 N nitric acid | 0.1 ml |
| 28% Ammonia water (diluted 10-fold) | 3 drops (with 2 ml Komagome pipet) |

After the above treatment, the specimen was quickly washed with 95% alcohol and then treated with a reducing solution for 2 minutes.

Here, the reducing solution comprises the following composition.

| | |
|---|---|
| 95% Alcohol | 100 ml |
| Pyrogallol | 5 g |
| Neutral formalin | 5 ml |

After the above treatment, the specimen was washed three times with 95% alcohol, three times with 99% alcohol and then treated twice with xylol. The specimen was sealed on the slide glass.

The state of the cell specimens on the slide glasses in the above staining operation is shown in the following Table.

| | | Control | |
|---|---|---|---|
| Slide glass No. | Invention | No treatment | Treated with egg white |
| 1 | − | + | − |
| 2 | − | + | − |
| 3 | − | + | − |
| 4 | − | + | − |
| 5 | − | + | − |

+ Peeled off
− Not peeled off

The peel-off shown here is partial peel-off, and the expression of + indicates peel-off of about 20% of the fixed cell specimen, and − indicates that substantially no peel-off was observed.

What is claimed is:

1. A slide glass, comprising:
   a slide glass structure having a glass surface with silicic acid groups and a lipophilic functional group introduced into at least a part of said silicic acid groups by the reaction of a hydrocarbyl halosilane compound with said silicic acid group so that said surface has improved adhesiveness to a tissue specimen for microscopic examination.
2. The slide glass according to claim 1, wherein the lipophilic functional group is an alkyl group.
3. The slide glass according to claim 2, wherein the lipophilic functional group is introduced by the reaction between an alkyl halosilane and a substrate glass.
4. The slide glass according to claim 3, wherein the alkyl halosilane is dialkyl dichlorosilane.
5. A process for preparing a stained tissue specimen fixed on a slide glass for microscopic examination, which comprises:
   (1) providing a slide glass as claimed in claim 1;
   (2) providing a tissue specimen to be observed;
   (3) fixing the tissue specimen on the slide glass;
   (4) subjecting the tissue specimen fixed on the slide glass to a staining process; and
   (5) applying a cover glass on the thus stained tissue specimen on the slide glass to form a stained tissue specimen.
6. The process as claimed in claim 5, wherein the staining process comprises treating the cell sample in an aqueous staining solution.
7. A slide glass, comprising:
   a slide glass structure having a glass surface with silicic acid groups and a lipophilic functional group selected from the group consisting of alkyl groups and aryl groups introduced into at least a portion of said silicic acid groups so that said surface has improved adhesiveness to a tissue specimen for microscopic examination.

* * * * *